Figure 1:
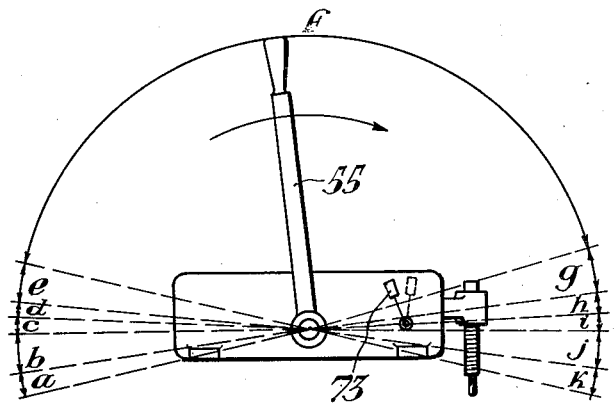

Sept. 4, 1951 P. LAZE 2,566,946
APPARATUS FOR THE ELECTRICAL CONTROL
OF RAILWAY TRACK SWITCHES
Filed Dec. 3, 1947 3 Sheets-Sheet 1

INVENTOR.
Pierre Laze
BY
*signature*
HIS ATTORNEY

Sept. 4, 1951 P. LAZE 2,566,946
APPARATUS FOR THE ELECTRICAL CONTROL
OF RAILWAY TRACK SWITCHES
Filed Dec. 3, 1947 3 Sheets-Sheet 3

INVENTOR.
Pierre Laze.
BY
HIS ATTORNEY

Patented Sept. 4, 1951

2,566,946

UNITED STATES PATENT OFFICE 2,566,946

APPARATUS FOR THE ELECTRICAL CONTROL OF RAILWAY TRACK SWITCHES

Pierre Laze, Paris, France, assignor to Compagnie des Freins et Signaux Westinghouse, Paris, France Application December 3, 1947, Serial No. 789,357
In France July 26, 1946

Section 1, Public Law 690, August 8, 1946
Patent expires July 26, 1966

7 Claims. (Cl. 246—240)

In a prior application for Letters Patent of the United States, Serial No. 789,356, filed December 3, 1947 by the present applicant, a mechanism is described for operating railway track switches by an electric motor, the assembly of the motor and its mechanism constituting what may be called a "switch machine."

This mechanism utilizes differential gearing to obtain a speed reduction which is combined with means for limiting the effort exerted by the motor and with a disengaging device between the motor and that portion of the mechanism by which the switch may be operated by hand.

This prior application also discloses, for hand operation, a lever by means of which safety locking may be established in order to avoid certain improper operations.

Furthermore, in that application the motor is supplied with energy over an electrical circuit controller which interrupts the supply circuit at each end of the stroke of the switch, while permitting its operation in the inverse direction and governing the establishment of a plurality of circuits for indicating the position of the switch machine.

The present invention has for its object the improvement of this type of switch machine with a view to simplifying its functioning. This invention presents the following characteristics which should be considered singly or in various combinations, including also combinations with certain characteristics of the machine of the prior patent, with which they are compatible:

1. When it is desired to operate the switch by hand, a simple rotation of the principal operating lever from one of its extreme positions to the other effects successively the following operations: The interruption of the supply circuits for the electric motor, disconnection of the motor from the mechanism, engagement of the operating lever with said mechanism, interruption of circuits for indicating the position of the switch machine, the unlocking of the operating shaft for the switch, the movement of the switch, the locking of the operating shaft, establishment of circuits for indicating the position of the switch, disconnection of the principal operating lever from the mechanism, the reconnection (or conditioning for reconnection) of the electric motor to the mechanism, and the re-establishment (or conditioning for re-establishment) of the supply circuits for the electric motor.

2. The device for engaging and disengaging the principal operating lever with respect to the mechanism comprises a rotatable sliding shaft to which said lever is keyed, a locking element, and a cam adapted to effect the sliding movement of said shaft.

3. The device for limiting the motor effort, which constitutes at the same time a device for engaging and disengaging the electric motor with respect to the mechanism, consists of a band brake which is susceptible of acting in the two directions of rotation, the application and release of which are governed by an eccentric cam system.

4. The engaging spring for the device indicated under item 3 is mounted in a cage limiting its extension in order that the complete release of the brake band may be assured with a short stroke of the disengaging control means, the height of the cage being subject to regulation to permit adjustment of the amount of compression of the spring.

5. The control of the eccentric cam for actuating the above-referred to brake band system is effected by a linkage actuated by a pivoted control lever which is engaged by a notched disk keyed to the shaft of the principal operating lever.

6. An auxiliary lever permits the actuation of safety contacts arranged to interrupt the circuit for the electric motor during the manual operation of the switch machine.

7. A device for locking the principal operating lever by the auxiliary lever may be provided in order to lock the operating lever, unless the auxiliary lever is placed in a suitable position.

Other characteristics and advantages of the present invention will be made apparent in the course of the description which follows and by the examination of the annexed drawings, which represent schematically and by way of example only, one form of apparatus embodying the present invention.

Figure 3:
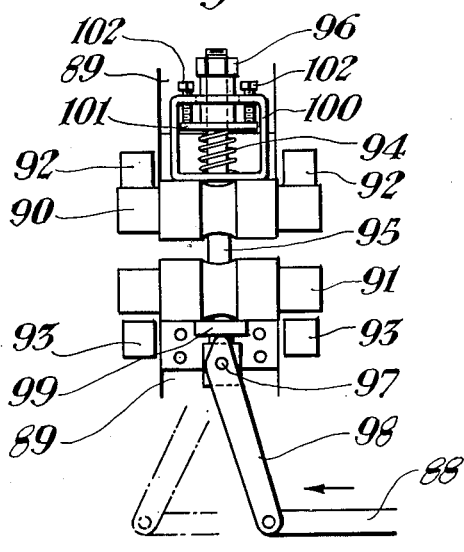
Figure 4:
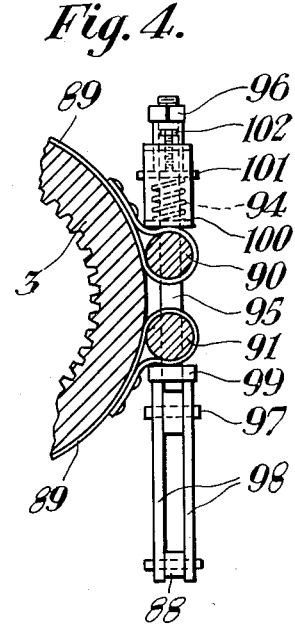
Figure 5:
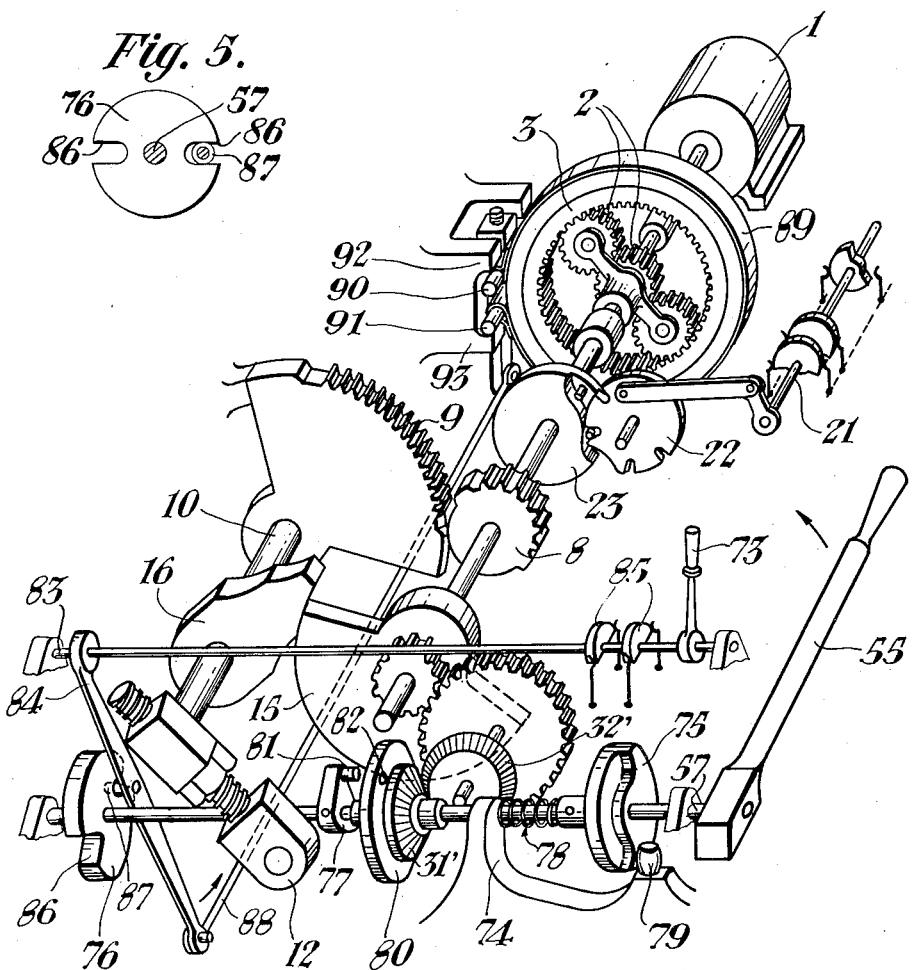
Figure 6:
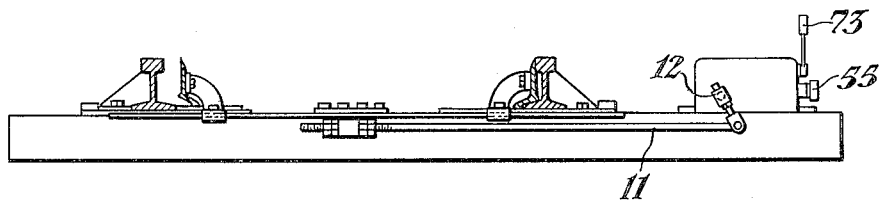

In the accompanying drawings, Fig. 1 is a side elevation of the manual operating lever and of a case containing a switch machine conforming to the invention; Fig. 2 is a perspective view to a larger scale of the switch machine contained in the case of Fig. 1; Figs. 3 and 4 show, to a still larger scale and partly in section, the side and front elevation, respectively, of a detail of the device for adjusting and for disengaging the brake which limits the motor effort; Fig. 5 shows the modification in which the operating lever is locked by the auxiliary lever; Fig. 6 is a view showing how the switch machine may be connected to the movable points of a track switch; and Fig. 7 is a diagram of the control and indication circuits for the switch machine.

As may be seen from the drawings (see Fig. 2) there may be found in the switch machine of Fig. 1 the following elements disclosed in the prior application: The electric motor 1, the speed reducer 2—3 of the differential type, the transmission by gears 8—9 to the shaft 10 for operating the switch (by means of lever 12) the locking mechanism which prevents the switch from reacting upon the mechanism when the switch is at the end of its stroke, the manual control lever 55, and the circuit controller 21 for effecting, at each end of the stroke of the switch, the interruption of the supply circuit for motor 1, said controller being operated by the actuating elements 22 and 23 and serving to establish in addition the circuits for indicating the position of the switch machine.

Figure 7:
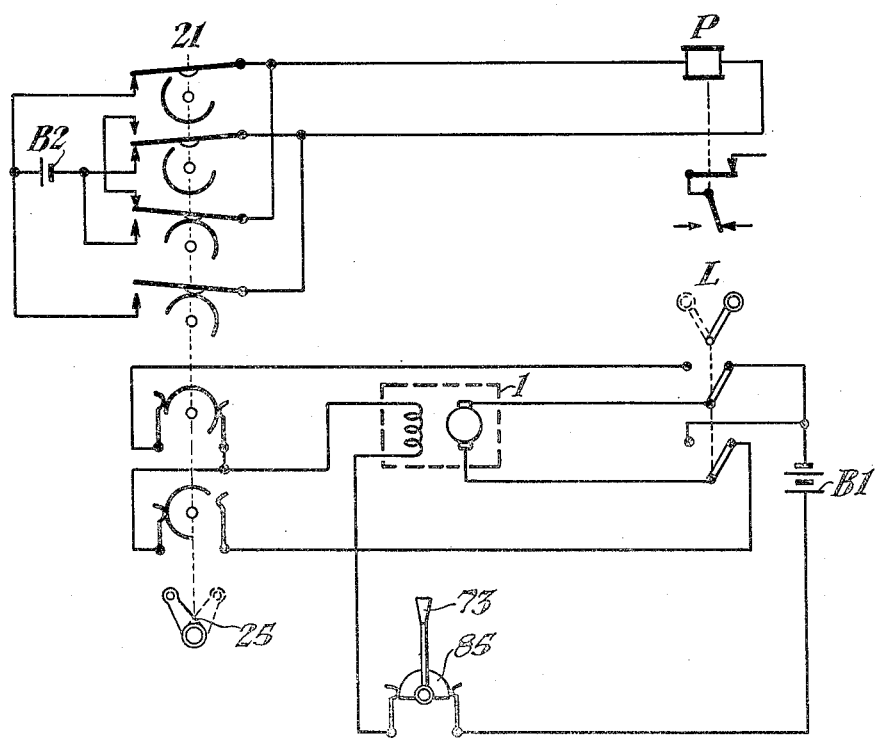

As shown in detail in Fig. 7, the electric motor 1 may be supplied with energy from a source B1 by the operation of a lever L, for rotation in one direction or the other, and at the end of the stroke an indication relay P is supplied with energy of normal or reverse polarity from a a source B2, depending upon the position of the switch.

With a view to simplifying the manual control, means have been provided in accordance with the present invention by which, by a simple rotation of the principal operating lever 55, different phases of the functioning are effected as lever 55 assumes the different angular positions $a$ to $k$, as indicated in Fig. 1, in the course of its movement in the direction of the arrow in the following manner:

*a*. Interruption of the supply circuits for motor 1;

*b*. Disconnection of the motor with respect to the mechanism;

*c*. Engagement of lever 55 with the mechanism;

*d*. Interruption of the circuits for indicating the position of the switch machine;

*e*. Unlocking the operating shaft 10 for the switch by the member 15;

*f*. Movement of the switch by lever 55;

*g*. Locking the operating shaft 10 for the switch by the member 15;

*h*. Re-establishment of circuits for indicating the position of the switch machine;

*i*. Disconnection of the principal operating lever with respect to the mechanism;

*j*. Reconnection (or conditioning for reconnection) of the electric motor to the mechanism;

*k*. Re-establishment (or conditioning for re-establishment) of the supply circuits for motor 1.

When the manipulation of lever 55 is in a direction inverse to that indicated by the arrow in Fig. 1, in order to return the switch to its initial position, similar operations are effected as follows:

*k*. Interruption of the supply circuits for motor 1.

*j*. Disconnection of the motor with respect to the mechanism

*i*. Engagement of lever 55 with the mechanism, etc.

The reconnection at the end of the stroke of the electric motor with the mechanism and the re-establishment of the supply circuits for the motor (operations *j* and *k* in the direction of the arrow in Fig. 1) may be caused directly by the movement of the principal lever 55 or may merely be permitted due to the position of this lever. In the latter case, the reconnection in question is made as shown in Fig. 7 by means of an auxiliary lever 73 which is operated manually to the dotted line position indicated in Fig. 1 for electric motor operation, but which automatically takes the position for manual operation indicated in full lines in case lever 55 is displaced in one direction or the other.

As a modification it will be readily apparent that the auxiliary lever 73 may be arranged to lock the lever 55 in its extreme positions, that is to say, so that the lever 55 is not movable until the auxiliary lever 73 has been placed manually in the position for manual operation (indicated by full lines in Fig. 1). The circuit re-establishment and motor re-engagement above referred to may also be effected manually as in the preceding case.

In Fig. 2 one form of switch machine is represented by way of example only, which is arranged in accordance with the invention to permit the realization of the conditions above indicated. As may be seen, the principal lever 55 is keyed to a shaft 57 which can both turn and slide in its bearings one of which is represented by the reference character 74 in Fig. 2. On this shaft are mounted the cams 75 and 76 and a driving crank or other means for engagement 77. The assembly of parts 55, 57, 75, 76, and 77 is urged permanently toward the right by a spring 78 which is supported on a fixed abutment formed by one of the bearings for shaft 57. The cam 75 is pressed against a roller 79.

The bevel pinion 31' which remains constantly in engagement with the pinion 32', as well as the disc 80 which is solid with pinion 31', are both bored for the passage of shaft 57 but do not follow its longitudinal displacement.

In the position of lever 55 represented in Fig. 2, the assembly is conditioned for electric motor operation, and the parts 31' and 80 can turn freely on shaft 57 which remains fixed during this operation. At the beginning of the manual operation, the cam 75, turning and sliding with the shaft 57, causes the pin 81 of crank 77 to enter a hole 82 in the plate 80.

Leaving this position (corresponding to the displacement of lever 55 from the angular position *c* in Fig. 1) the said lever 55 actuates the mechanism and the track switch. Towards the end of the stroke of the lever (when it reaches position *i*, Fig. 1) the roller engages the second elevation of cam 75, compressing spring 78 and withdrawing pin 81 from the hole 82. If from any accidental cause in the course of motor operation, the mechanism stops in an intermediate position, the pin 81 enters the hole 82 as soon as the position of lever 55 comes into correspondence with the position of the mechanism, and the completion of the operation may then be effected as hereinbefore described.

On the shaft 83 of the auxiliary lever 73 are mounted a lever arm 84 and safety contacts 85 adapted to interrupt the circuit of the electric motor during manual control. The cam 76 is provided with two V-formed notches which can be entered by a roller 87 mounted on lever 84.

At the beginning of the rotation of the principal lever 55 (displacement angle *a*, Fig. 1) the roller 87 is driven out of the notch 86, shaft 83 rotates and the safety contacts are interrupted.

It will be apparent that if the notches 86 of cam 76 had a suitably different form (instead of being in the form of a V) the roller 87 could not be driven out of the notch and its presence therein would lock the lever 55 in each of its extreme positions as long as the auxiliary lever 73 occupies the position shown in Fig. 2. This arrangement is shown in Fig. 5, and constitutes the modification referred to above.

The rotation of lever 84, whether it is caused in one manner or the other, actuates a shaft 88 which releases the outer cage 3 of the differential speed reducer, which has the effect of mechanically disconnecting the electric motor 1 from the rest of the mechanism.

The outer cage 3 is effectively locked for motor operation by means of a brake band 89 arranged to act in the two directions of rotation. The extremities of the flexible band 89 are constrained by the blocks 90 and 91 (see particularly Fig. 4) of which the displacement is limited by the fixed lugs 92 for one direction of rotation and by the lugs 93 in the other direction (see Fig. 3). The band pressure is obtained by means of a spring 94 through the intermediary of a special bolt 95 and a nut 96. For either direction of rotation the force which draws the parts 90 and 91 together is the same and this force can be regulated by adjustment of the position of the nut 96 on the bolt 95.

The shaft 88 referred to above causes the rotation about an axis 97 of a lever 98 of which the end is in the form of an eccentric by which a washer 99 is displaced vertically, this being equivalent to an increase or decrease in the length of the head of the bolt 95 with respect to its stem resulting in a variation in the pressure exerted by spring 94. When the shaft 88 is moved in the direction of the arrow, the spring is disengaged, the flexible band 89 does not exert pressure on the outer cage 3, and this can turn freely with the remainder of the mechanism for operation by hand without actuating the electric motor 1.

In order that the force exerted by the spring 94 may be substantially constant and independent of the wear or elongation of the flexible band 89, but may be annulled completely when released, the spring is mounted in a cage 100 which prevents it from expanding fully.

To permit adjustment of the position at which the spring comes into play, the height of this cage is adjustable by means of a device shown schematically in Figs. 3 and 4 comprising a washer 101 and two screws 102. The hole in washer 101 permits the passage of bolt 95, but the washer engages the base of screw 96 which may move freely in the hole in the upper portion of cage 100.

It will be seen from the preceding description that the switch machine as arranged in accordance with the invention functions in a manner which is very simple and at the same time very reliable.

Moreover, various modifications may be made in the details of construction of the embodiment of the invention shown and described by way of example without altering the spirit or scope of the invention.

Having thus described my invention, what I claim is:

1. A switch machine for operating a railway track switch comprising a mechanism adapted to be actuated by an electric motor for effecting the power operation of said switch and having a lever which is rotatable from one extreme position to another for effecting the manual operation of said mechanism when desired, two circuit controllers in said mechanism including one for controlling the supply circuit for the motor and another for controlling circuits for indicating the position of said switch machine, said mechanism also including a shaft for effecting the operation of the switch with locking means for preventing the movement of said shaft by the switch, means for at times disengaging said motor from said mechanism, and means controlled by said lever in different angular positions for controlling said circuit controllers, operating shaft, locking means and disengaging means in response to a simple rotation of said lever in either of two directions from one extreme position to the other, so arranged as to effect the interruption of the supply circuits for said motor and the disconnection of said motor from said mechanism, in response to the rotation of said lever from either extreme position to a position for effecting the engagement of said lever with said mechanism, the further rotation of said lever to its other extreme position being adapted to effect successively the interruption of said indicating circuits, the unlocking of said operating shaft, the rotation of said shaft to effect the movement of said switch, the locking of said operating shaft, the re-establishment of said indicating circuits, the disengagement of said lever from said mechanism, the connection of said motor to said mechanism and the re-establishment of the supply circuits for said motor.

2. In a switch machine for operating a railway track switch comprising a mechanism adapted to be actuated by an electric motor or by the rotation of a manually operable lever between two extreme positions, a device for effecting the engagement and disengagement of said lever with respect to said mechanism comprising a rotatable sliding shaft to which said lever is fixed and having thereon means for engaging said mechanism when said shaft is moved longitudinally, and a cam on said shaft adapted to effect such longitudinal movement automatically in response to the rotation of said shaft through a predetermined angle from either extreme position.

3. In a switch machine for operating a railway track switch comprising a mechanism adapted to be actuated by an electric motor or by the rotation of a manually operable lever between two extreme positions, a device for limiting the effort exerted by said motor upon said mechanism and for disengaging the motor from the mechanism for operation by said lever, comprising a differential speed reducer having a rotatable member normally held stationary by a friction brake to enable the motor to exert its effort upon said mechanism in either direction of rotation, control means comprising an eccentric cam system for effecting the application and release of said brake, manually operable means controllable in accordance with the angular position of said lever for actuating said eccentric cam system so as to disengage the motor from said mechanism except when said lever is substantially in one extreme position or the other, and means for engaging said lever with said mechanism effective only when the lever occupies an intermediate position in which the motor is not in engagement with said mechanism.

4. In a switch machine according to claim 3, a compression spring for applying the friction brake, a cage within which said spring is mounted to limit its extension in order that a complete release of the brake may be assured with a short stroke of the control means for actuating said eccentric cam system, and means for regulating the height of the cage to permit adjustment of the amount of compression of said spring.

5. In a switch machine according to claim 3, in which the control means for the friction brake comprises a brake control lever carrying a cam follower and operatively connected to said eccentric cam system, and a cam actuated by movement of the shaft of the operating lever for the switch and adapted to control the position of said cam follower to effect the application or release of said brake depending upon the position of said operating lever.

6. In a switch machine according to claim 5, in which a circuit controller is provided on the shaft of the brake control lever whereby said lever is adapted to open the supply circuits for the switch motor as well as to effect the release of said brake when the operating lever for the switch occupies a position in which the switch machine is conditioned for manual operation.

7. In a switch machine according to claim 5, in which the cam which engages the cam follower of the brake control means is so proportioned that the cam follower serves normally to lock the switch operating lever to prevent its movement away from either extreme position and in which an auxiliary manually operable lever is provided for actuating said brake control means to concurrently disengage the motor from the mechanism by the release of the friction brake and to unlock the switch operating lever.

PIERRE LAZE.

REFERENCES CITED

The following references are of record in the file of this patent:

UNITED STATES PATENTS

| Number | Name | Date |
|---|---|---|
| 942,843 | Potter et al. | Dec. 7, 1909 |
| 1,699,653 | Bronander | Jan. 22, 1929 |
| 1,930,722 | McWhirter | Oct. 17, 1933 |